Aug. 15, 1967 P. O. BERG 3,336,006
APPARATUS FOR MIXING GRANULAR, POWDERED AND THE LIKE MATERIALS
Filed Oct. 24, 1965 2 Sheets-Sheet 1

INVENTOR.
PAUL O. BERG
BY Hood, Gust and Irish
ATTORNEYS

Aug. 15, 1967  P. O. BERG  3,336,006
APPARATUS FOR MIXING GRANULAR, POWDERED AND THE LIKE MATERIALS
Filed Oct. 24, 1965

INVENTOR.
PAUL O. BERG
BY Hood, Gust & Irish
ATTORNEYS

United States Patent Office 3,336,006
Patented Aug. 15, 1967

3,336,006
APPARATUS FOR MIXING GRANULAR, POWDERED AND THE LIKE MATERIALS
Paul O. Berg, 2217 Indian Village Blvd.,
Fort Wayne, Ind. 46807
Filed Oct. 24, 1965, Ser. No. 504,868
10 Claims. (Cl. 259—2)

The present invention relates to an apparatus for mixing granular, powdered and the like material, and more particularly to an apparatus whereby mixing is accomplished by precision subdivision of one or more gravitating streams of materials.

In the prior art, it is conventional to mix intimately powdered, granular or other like materials of different character or grade. Many different apparatus and methods have been used for this purpose; however, they have variously been deficient in being uneconomical in operation, inadequate with respect to obtaining a homogeneous mixture, or unreliable in connection with the mixing of different initial quantities of material. In the field of mixing seeds, grain, meal and the like substances used in the preparation of food for farm animals and the like, it is now required in a great many situations that almost infinitesimally small amounts of ingredients be homogeneously mixed with enormously large (by comparison) quantities of basic meal or grain. In obtaining homogeneous mixtures in the preparation of animal feed, prior art methods and apparatus have not been capable of providing a homogeneous mixing of the smaller ingredient masses with the larger ingredient masses. The present invention constitutes an improvement in obtaining more homogeneous mixtures.

It is therefore an object of this invention to provide an apparatus for mixing quantities of granular, powdered, and the like material.

It is another object of this invention to provide an apparatus for mixing animal feed which is composed of different quantities of ingredients ranging from extremely small to comparatively large amounts, the mixing being carried out in such a manner that the final mix is substantially homogeneous throughout its mass.

It is yet another object of this invention to provide an apparatus for mixing animal feed whereby an initial batch of all the ingredients is repeatedly subdivided controllably and accurately in such a manner that the final subdivision will contain the desired proportionate quantities of the individual ingredients. These finally subdivided batches may, therefore, be recombined into a common batch which will be substantially homogeneous throughout its mass with respect to the proportions of ingredients.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
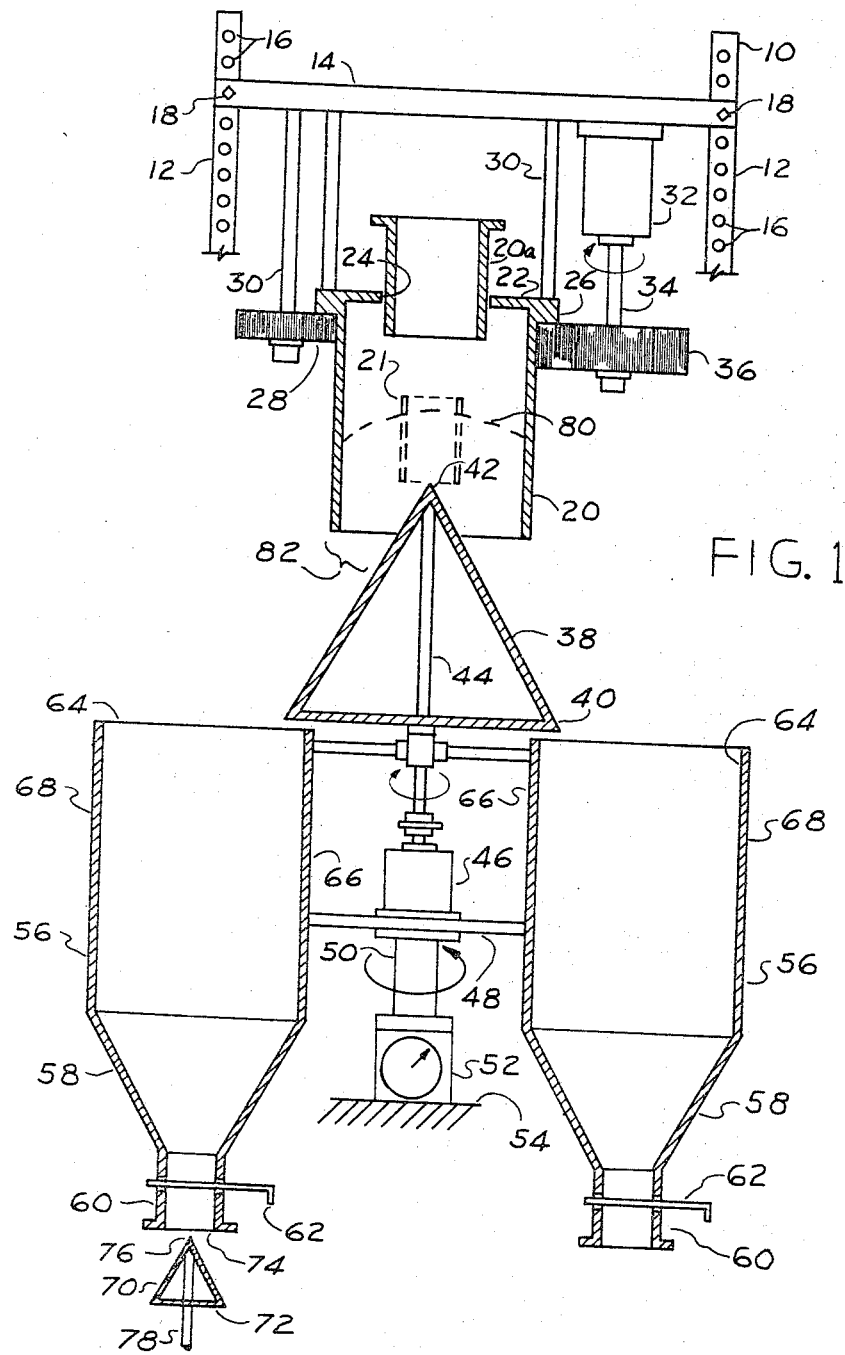
FIG. 1 is a vertical sectional view of one embodiment of an apparatus of this invention.
Figure 2:
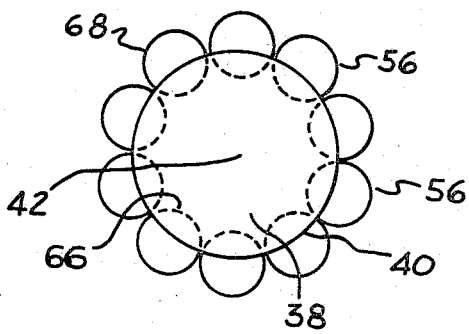
FIG. 2 is a top plan view of the first rotor and underlying bin group shown in FIG. 1.

Referring to the drawings, and more particularly to FIGS. 1 and 2, an initial, stationary supporting framework, generally indicated by the numeral 10, made of suitably rigid material such as angle irons, includes two upright posts 12 which are laterally spaced apart as shown and which have connected therebetween a horizontal supporting beam 14. The uprights 12 are provided with a series of vertically spaced apertures 16 through which may be received suitable bolts 18 for fastening the supporting beam 14 to the uprights 12. The apertures 16 are vertically spaced apart such distances as will permit the vertical adjustment of the beam 14 for purposes which will become apparent from the description that follows.

Located immediately beneath the beam 14 is a tubular conduit or spout 20 which is provided with coaxial inner and outer, peripheral surfaces. This conduit 20 is positioned upright as shown with its axis vertical. The upper end of this conduit 20 has an end wall 22 provided with a coaxial feed-opening 24. Extending radially outwardly from this end wall 22 is an annular flange 26 which rests on a plurality of idler rollers 28 arranged in a circular pattern about the axis of the conduit 20. Only one such roller 28 is shown in FIG. 1. This particular roller 28 is mounted for free rotation on an upright shaft 30 which is suitably secured to the beam 14 structure. The annular flange 26 rests on the upper side of the wheels 28 while the peripheral surfaces of the latter firmly engage and centers the outer surface of the conduit 20.

A motor 32 having a depending shaft 34 is used to drive a rubber or the like roller 36 secured to the lower end of the shaft 34. This roller 36 also engages the outer periphery of the conduit 20 and has resting on the upper side thereof the annular flange 26. Thus, by means of the various idler rollers 28 and the driving roller 36, the conduit 20 is firmly held in position for rotation about its axis. The motor 32 may be electrical.

It will now be seen that by adjusting the beam 14 either upwardly or downwardly in the holes 16, the vertical position of the conduit 20 may be changed.

Coaxially situated immediately beneath the conduit 20 is a cone-shaped rotor or cone generally indicated by the numeral 38. In one embodiment of this invention, this cone 38 is formed of highly polished steel of sufficient thickness and weight as to be rigid. The apex of this cone 38 is upright and preferably sharp, and the axis of the cone is coextensive with the axis of the conduit 20. The diameter of the base 40 of the cone is deliberately made larger than the inner diameter of the conduit 20 for a reason which will become apparent from the description that later follows. In the position shown, the apex 42 of the cone projects a slight distance upwardly into the conduit 20; however, the conduit 20, by reason of the mounting of the beam 14 on the uprights 12, may be adjusted downwardly to a position in which the lower end of the conduit 20 will coaxially seat onto the surface of the cone 38 for the purpose of serving as a shut-off valve and in the alternative may be raised high enough so as to clear completely the apex 42.

The cone 38 is mounted on the upper end of a vertical shaft 44, which is coaxial with the cone, the lower end of the shaft being connected to an electric motor 46. This motor 46 is in turn mounted on a suitably rigid frame 48 which rests on and is secured to the upper end of a supporting post 50. This supporting post 50 rests on and is secured to suitable, weighing scales 52, these scales 52 finally resting on the stationary frame support 54. Rotation of the shaft 44 by the motor 46 serves to spin the cone 38 about its axis for a purpose which will become apparent from the description that follows.

Situated directly beneath the rotor 38 are a plurality of bins, generally indicated by the numeral 56. In one embodiment of this invention, the bins 56 are tubular in shape and are provided at the lower ends thereof with coaxial frusto-conical portions 58 which terminate in depending, cylindrical spout portions 60 having shut-off gates 62 operatively mounted thereon. The spouts 60 are coaxially positioned with respect to the bin axis.

All of the bins 56 are arranged in an abutting, circular pattern as shown more clearly in FIG. 2, this pattern being concentric about the common, vertical axis of the conduit 20 and the cone 38. The upper ends 64 of these bins 56 are open, and the bins themselves are of such size that the radially innermost portions 66 thereof define points on a circle which lies concentrically inside the circle of the cone base 40. Also, these bins are so arranged that the outermost radial portions 68 thereof lie radially outwardly of the cone base 40. Thus, the cone base 40 overlies the openings 64 of the bins 56 as is shown clearly in both FIG. 1 and FIG. 2.

Securing these bins 56 in this position and grouping is the framework 48 which may take the form of a rigid disc which is welded at its periphery to the bins 56. Suitable reinforcing in addition to the framework 48 may be used for securing positively the bins 56 in this position.

The frame 48 which supports the bins 56 may be rigidly mounted onto the post 50 and the latter as well as the scales 52 be held against rotation. Being so mounted, the bins 56 are rigidly held against any vertical, horizontal or rotational movement with respect to the stationary supports 10 and 54.

In the alternative, the frame 48 may be rotationally mounted on the upper end of the supporting post 50 such that it can be rotated about a vertical axis which is an extension of the axes of the conduit 20 and cone 38. By this means, the entire group of bins 56 may be rotated as a unit. The reason for this will be explained later on.

The scales 52 are of conventional design and serve the purpose of providing an indication of the weight of the bin group 56 and any material which may be therein. Other suitable arrangements for providing an indication of the weight of the bins 56 may be used without departing from the spirit and scope of this invention.

In one embodiment of this invention, situated immediately beneath only one of the bins 56 and in coaxial registry with the lower circular opening of the spout portion 60, is a secondary cone-shaped rotor or cone 70. This cone 70 as well as its supporting structure may be identical with that of the cone 38 with the exception that it is smaller, the base portion 72 thereof being larger than the opening 74 of the spout portion 60. The axis of this cone 70 is an extension of the axis of the spout portion 60 and bin 56. The apex 76 may be positioned where shown in FIG. 1 or in the alternative moved slightly higher until it projects into the spout 60. The vertical shaft 78 which supports the cone 70 may be made vertically adjustable to position the cone 70 in a desired location with respect to the spout portion 60. The shaft 78 may be secured to a motor the same as the cone 38 such that illustration thereof is unnecessary. Immediately beneath this cone 70 is positioned another series of bins (not shown) of smaller size than the bins 56 but otherwise identically shaped and arranged with respect to the cone 70. Suitable framework and the like secure these smaller bins in position with respect to the cone 70 such that the cone 70 and its underlying pattern of bins constitutes a miniaturized version of the cone 38 and its bins 56.

Each of the bins (not shown) beneath the cone 70 may in turn have cones positioned at the outlets thereof, and this pattern of cone and bin structure may be further repeated to any extreme desired. The practical limit of the number of bin-cone assemblies will become apparent from the description which follows.

Figure 3:
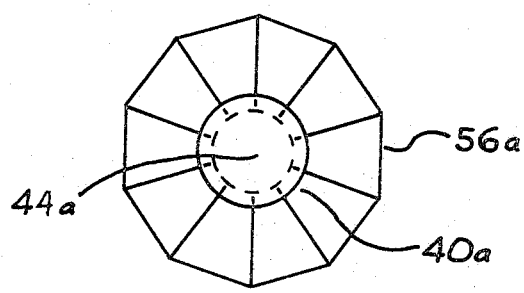
FIG. 3 is a view similar to FIG. 2 showing a slightly different embodiment of this invention.

The bins shown in FIGS. 1 and 2 are circular in shape as shown. However, as will become apparent from the description which follows, they need not be circular but may have different shapes such as the one shown in FIG. 3. In FIG. 3, the individual bins 56a may be shaped, in cross-section, as trapezoids, the angular sides thereof being radial with respect to the cone axis 44a. As is true of the arrangement of FIG. 2, the base of the cone 40a overlies the upper, open ends of the bins 56a.

Still other shapes for the bins may be used without departing from the spirit and scope of this invention. In one embodiment of this invention, all of the bins 56 are of identical size and shape, and all of the bins 56a are of identical size and shape.

Referring now to FIGS. 1 and 2, the operation of the apparatus described thus far will be explained. Initially, the conduit 20 may be positioned vertically with respect to the cone 38 as shown in FIG. 1. An auxiliary spout 20a may be positioned centrally within the opening 24 as shown for the purpose of directing a flow of granular material, such as corn, oats or ground meal, into the conduit 20. This material is poured into the conduit 20 at a sufficiently high rate that it quickly builds up to a level, in the conduit 20, as shown by the dashed line 80 (FIG. 1). This material flows through the conduit 20 out of the bottom end thereof through the annular passage (indicated by the bracket 82) defined between the cone 38 and the lower perimeter of the conduit 20. This material, in a stream having a thickness about the length of the bracket 82, continues its downward flow over the surface of the cone 38 and into the various bins 56. In one operation, the gates 62 are initially closed, and in this example being explained, this will be regarded as the situation. Therefore, as the material is poured into the conduit 20, it passes downwardly over the cone 38 and into all of the bins 56. When these bins 56 are nearly filled, the pouring of material into the conduit 20 is ceased.

While the material is being poured into the conduit 20 and is flowing downwardly over the cone 38, both the conduit 20 and cone 38 are rotated. However, the directions of rotation are opposite such that, looking downwardly on the apparatus shown in FIG. 1 and as illustrated in FIG. 2, the conduit 20 may be rotated clockwise and the cone 38 counterclockwise. Thus, the material which is piled up in the conduit 20 and which is flowing over the surface of the cone 38 is constantly being uniformly agitated such that the material ultimately falling into the bins 56 will evenly divide between these bins. Thus, the material which is poured initially into the conduit 20 is divided into equal batches or quantities into the bins 56.

Depending upon the flow characteristics of the material being poured into the conduit 20, the size of the aperture 82 may be adjusted. This adjustment is brought about by raising or lowering the supporting beam 14 on the upright mounts 10.

In one form of operation, it may be desirable to drop the conduit 20 until it engages the cone 38 and then pour the material into the conduit 20 to a desired level. Following this, the supporting beam 14 may be raised to a location at which the desired flow through the aperture 82 is obtained. Instead of using bolts 18 for obtaining the vertical adjustment of the supporting beam 14, any different arrangement may be used whereby vertical adjustment of the conduit 20 may be secured as desired. The arrangement shown in FIG. 1 is just one of many possible ways of securing vertical adjustment of the conduit 20.

The speeds of rotation of the conduit 20 and cone 38 may vary with the materials and distribution desired. The speed should be rapid enough to provide for even distribution of material into all of the bins 56 but not so rapid as to throw the material outwardly, by centrifugal force, to an extent that some of the material would miss falling to the bins 56. Another reason for rotating the conduit 20 and cone 38 oppositely is to overcome any imperfections in size and shape of these two parts. The counter rotation serves in evenly dividing the imperfections throughout the circumference thereof such that material may be evenly and uniformly distributed to the various bins 56.

As explained earlier, one embodiment of this invention provides for rotation of the bin 56 group. Using only a single cone 70, each bin 56 may sequentially be centered thereover and the contents discharged by opening the respective gate 62. The contents of each bin 56 may thereby be divided equally among the bins positioned beneath the cone 70. After one bin 56 is opened, the entire bin group may be indexed to position the next full bin over the cone 70. This process may be repeated until all of the bins 56 are emptied over the cone 70.

In an alternative construction, there is one cone 70 for each bin 56 and all of these may be operated in unison for emptying the bins 56 as a group more quickly than otherwise would be possible by using only a single rotor 70. It will be understood, of course, that each of the rotors 70 (assuming that there is one for each bin 56) will have a circular series of bins thereunderneath which will receive the divided streams of material which flow over the respective cone 70. Further subdivision may be obtained by use of additional cone-bin assemblies.

In the event a plurality of cones 70 (one for each bin 56) is used, the group of bins 56 need not be rotatable and the post 50 can be rigidly secured to both the scales 52 and the frame 48.

The reference numeral 21 in FIG. 1 indicates an auxiliary tubular conduit suitably adjustably mounted on the conduit 20 in coaxial relationship with respect to the cone 38. This smaller conduit 21 is used for smaller amounts of material than would be poured into the larger conduit 20 to insure initially even distribution of material over the apex 42 such that the quantities of material falling into the bins 56 will be equal.

Figure 4:
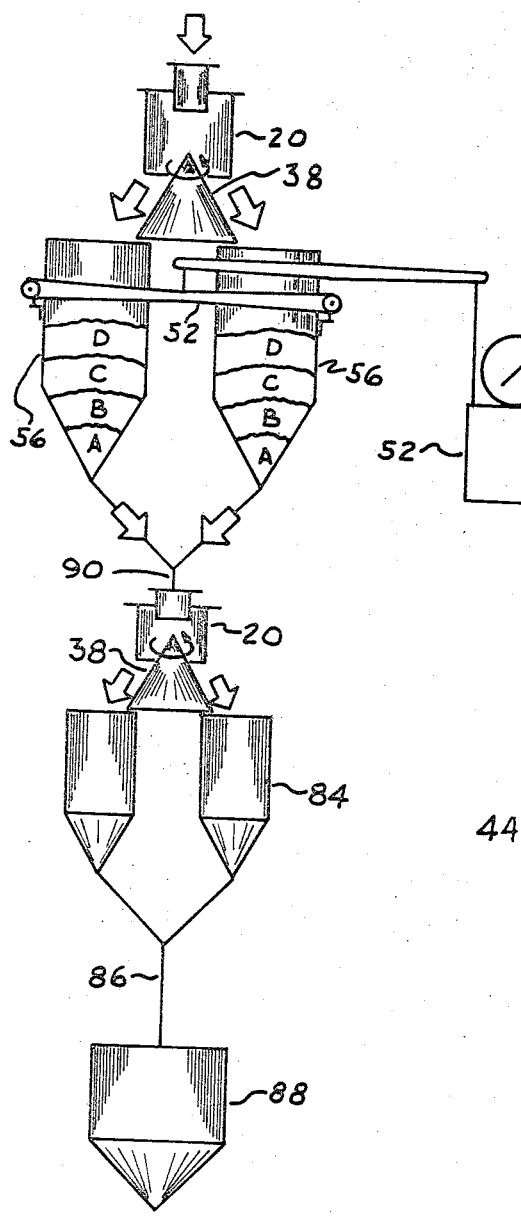
FIG. 4 is a flow diagram used in explaining the apparatus and principles of operation of this invention.

Referring to FIG. 4, like numerals will indicate like parts. FIG. 4 is a flow diagram of the apparatus described hereinabove and is indicative of different structural arrangements which may be used without departing from the spirit and scope of this invention. In the example depicted by this flow diagram, granular or meal material composed of ingredients A, B, C and D are being mixed together. Initially, material A is poured into conduit 20 and is caused to distribute evenly over the cone 38 as previously described. This material A being the smallest quantity of all of the ingredients fills the frusto-conically shaped portion of each bin 56 as shown. This quantity A in the bin 56 may be regarded as a layer inasmuch as it extends from side-to-side in the bin.

Next, ingredient B is poured into the conduit 20 and is caused to distribute evenly over the cone 38. In this example, it is assumed that there is more of ingredient B than there is of ingredient A to be mixed. This ingredient B gravitates into the bottom portion of the bins 56 and settles onto the ingredient A, in layer form as shown. Ingredients C and D are sequentially distributed evenly into the various bins 56 and these deposit in layers as shown. Thus, assuming that all of the gates 62 in the bins 56 are closed, each of the bins 56 will have equal quantities of the individual ingredients A, B, C and D. If there are ten (10) such bins 56, each bin 56 will contain one-tenth (1/10) of the total amount of the original ingredient poured into the conduit 20.

The ingredients of the individual bins 56 are next dispensed therefrom over a cone as previously explained, these ingredients being discharged in the order of the superposed layers. Since the ingredients A, B, C and D are in layer form, they will distribute evenly over the subdividing cone such that the next lower series of bins will receive equal quantities thereof.

If only a single cone or rotor 70 is used, each of the bins 56 is, in successive order, dispensed into the secondary group 84. This bin group 84 is fed through a common conduit 86 into a relatively large, final collecting bin 88. Contents may be dispensed from this latter bin as desired.

Ideally, all of the various bin-cone assemblies are vertically arranged; however, a suitable elevator or lifting conveyor may be interposed at about the point 90 in the system for lifting the material to the assemblies 84, 86 and 88 which may be mounted at an elevation comparable to that of the initial components 20, 38, 56.

For the most part, the force of gravity is used in obtaining the power required for the mixing operation, the only power needed being that connected with rotating the various conduits and cones. Mixing of ingredients occurs not only from stage to stage (each stage consisting of a cone-bin assembly), but also by reason of the flow of material eventually merging into a single conduit, such as the conduit 86, and finally into a common bin 88.

It will now be seen that an apparatus of such size as will handle 4,000 pounds, for example, of material may have mixed therewith, in substantial homogeneous distribution, one pound of a different material. If the final bin 88 is regarded as being of such size as will contain 4,000 pounds, samples of final mix taken from different locations throughout the mass will shown traces of the single pound of material.

From the foregoing, it will appear obvious to persons skilled in the art that many different modifications may be made without departing from the spirit and scope of this invention. For example, the angles of the cones 38, 70 may be varied. Also, instead of using cones 38 which are truly conical in shape, slight, longitudinally extending recesses may be used therein for evening-out the distribution. When such recesses are used, one type of flow may be obtained without rotating the cone 38.

By mounting the bin 56 group on weighing scales 52 (FIG. 1), the aggregate weight of material fed to the bins 56 can be constantly checked and controlled.

By shaping the primary, secondary, tertiary, etc. bins as described, the sequential subdivision from one bin to lower bins will result in the material of one kind distributing in the bins in layer form as already described. The bins are shaped such as to insure this layer distribution. Also, in feeding material to the apparatus initially, only mateiral of one kind is fed at one time. Hence, sequential, even subdivision is assured.

While there have been described above the principles of this invention in connection with specific apparatus, it is to be clearly understood that this description is made only by way of example and not as a limitation to the scope of the invention.

What is claimed is:

1. Mixing apparatus comprising a first upright tubular conduit having a vertically aligned axis, said conduit having upper and lower ends, means for vertically adjusting and holding said conduit in an adjusted vertical position, means for rotating said conduit in one direction about said axis, a first cone-shaped rotor disposed immediately beneath the lower end of said conduit with its axis upright and in vertical alignment with the axis of said conduit, the apex of said rotor being uppermost and the maximum diameter of the rotor being greater than the inner diameter of said conduit, means for holding said rotor in a fixed vertical position and for rotating the same about its axis in a direction opposite to that of said conduit, a plurality of bins arranged in a circular pattern in circumferential abutting relation to provide a first bin group, said bins having enclosing sides and open upper and lower ends, said bin group being positioned beneath and in concentric relation with said rotor, the base portion of said rotor having a circular perimeter which overlies the open upper ends of said bins between the radially inner and outer extremities of said open upper end whereby material flowing downwardly over the rotor surface will pass into said bins through the upper ends thereof, said bins and the open upper ends thereof being of equal size, means for controlling the flow of material from said bins through said lower open ends thereof; a plurality of second cone-shaped rotors disposed immediately beneath the lower open ends of said bins, respectively, there being one second rotor for each bin, the lower bin openings being circular and each defining a plane which is horizontal, the axis of each second rotor being in vertical alignment with the axis of the respective circular opening, the apex of each second rotor being uppermost, the maximum diameter of each second rotor being larger than the dimension of the respective circular opening, means positioning each second rotor a predetermined distance from the respective circular opening, means for rotating each second rotor about its axis, a plurality of second bin groups, each second bin group comprising a plurality of second bins arranged in a circular pattern about a vertical axis in circumferential abutting relation, there being one second bin group for each second rotor, each second bin having an open upper end, each second bin group being positioned beneath and in concentric relation with the respective second rotor, the base portion of each second rotor having a circular perimeter which overlies the open upper ends of the respective second bins between the radially inner and outer extremities thereof, the sizes of the last-mentioned open ends being equal, and means for combining into a single mass the material contained in all of said second bins.

2. Mixing apparatus comprising a first upright tubular conduit having a vertically aligned axis, said conduit having upper and lower ends, means for vertically adjusting and holding said conduit in an adjusted vertical position, means for rotating said conduit in one direction about said axis, a first cone-shaped rotor disposed immediately beneath the lower end of said conduit with its axis upright and in vertical alignment with the axis of said conduit, the apex of said rotor being uppermost and the maximum diameter of the rotor being greater than the inner diameter of said conduit, means for holding said rotor in a fixed vertical position and for rotating the same about its axis in a direction opposite to that of said conduit, a plurality of bins arranged in a circular pattern in circumferential abutting relation to provide a first bin group, said bins having enclosing sides and open upper and lower ends, said bin group being positioned beneath and in concentric relation with said rotor, the base portion of said rotor having a circular perimeter which overlies the open upper ends of said bins between the radially inner and outer extremities of said open upper end whereby material flowing downwardly over the rotor surface will pass into said bins through the upper ends thereof, said bins and the open upper ends thereof being of equal size, and means for controlling the flow of material from said bins through the lower open ends thereof.

3. Mixing apparatus comprising a first upright tubular conduit having a vertically aligned axis, said conduit having upper and lower ends, means for holding said conduit in vertical position, a first cone-shaped rotor disposed immediately beneath the lower end of said conduit with its axis upright and in vertical alignment with the axis of said conduit, the apex of said rotor being uppermost and the maximum diameter of the rotor being greater than the inner diameter of said conduit, means for holding said rotor in a fixed vertical position and for rotating the same about its axis, a plurality of bins arranged in a circular pattern in circumferential abutting relation to provide a first bin group, said bins having enclosing sides and open upper and lower ends, said bin group being positioned beneath and in concentric relation with said rotor, the base portion of said rotor having a circular perimeter which overlies the open upper ends of said bins between the radially inner and outer extremities of said open upper end whereby material flowing downwardly over the rotor surface will pass into said bins through the upper ends thereof, and means for controlling the flow of material from said bins through the lower open ends thereof.

4. For use in combination with mixing apparatus, a first upright tubular conduit having a vertically aligned axis, said conduit having upper and lower ends, means for vertically adjusting and holding said conduit in an adjusted vertical position, means for rotating said conduit in one direction about said axis, a first cone-shaped rotor disposed immediately beneath the lower end of said conduit with its axis upright and in vertical alignment with the axis of said conduit, the apex of said rotor being uppermost and the maximum diameter of the rotor being greater than the inner diameter of said conduit, and means for holding said rotor in a fixed vertical position and for rotating the same about its axis in a direction opposite to that of said conduit.

5. Mixing apparatus comprising first means for guiding vertically a gravitating stream of flowable material, second means for dividing said gravitating stream into a plurality of smaller gravitating streams, a plurality of receptacles for receiving individually said smaller streams, said second means including a body having a downwardly inclining surface which is rotatable about a vertical axis relative to said first means, and means for producing relative rotation about said axis between said surface and said first means.

6. Mixing apparatus comprising an upright conduit having a vertically aligned passage, said conduit having a lower end which is open, a rotor disposed immediately beneath said lower end, means mounting said rotor for rotation about a vertical axis, said rotor having a surface which slopes downwardly in a direction away from said axis, means for adjusting selectively said conduit toward and away from said rotor, means for rotating said conduit about a vertical axis, a plurality of receptacles arranged in an annular pattern about an upright axis, said receptacles being disposed below said rotor in gravitational-flow registry therewith whereby material flowing down said surface enters said receptacles, and means for dispensing material from receptacles.

7. Mixing apparatus comprising an upright conduit having a vertically aligned passage, said conduit having a lower end which is open, a rotor disposed immediately beneath said lower end, means mounting said rotor for rotation about a vertical axis, said rotor having a surface which slopes downwardly in a direction away from said axis, means for adjusting selectively said conduit toward and away from said rotor, means for rotating said conduit about a vertical axis, a plurality of receptacles arranged in an annular pattern about an upright axis, said receptacles being disposed below said rotor in gravitational-flow registry therewith whereby material flowing down said surface enters said receptacles, means for dispensing material from receptacles, and means for weighing said receptacles.

8. Mixing apparatus comprising an upright conduit having a vertically aligned passage, said conduit having a lower end which is open, a rotor disposed immediately beneath said lower end, means mounting said rotor for rotation about a vertical axis, said rotor having a surface which slopes downwardly in a direction away from said axis, means for adjusting selectively said conduit toward and away from said rotor, means for rotating said conduit about a vertical axis, a plurality of receptacles arranged in an annular pattern about an upright axis, said receptacles being disposed below said rotor in gravitational-flow registry therewith whereby material flowing down said surface enters said receptacles, means for dispensing material from receptacles, frame means for securing said receptacles together, means for indexing said receptacles about said upright axis to different preselected positions, and means for subdividing the contents of said receptacles sequentially as they are indexed to a common position.

9. Mixing apparatus comprising a first upright tubular conduit having a vertically aligned axis, said conduit having upper and lower ends, means for vertically adjusting and for holding said conduit in an adjusted vertical position, means for rotating said conduit in one direction about said axis, a first cone-shaped rotor disposed immediately beneath the lower end of said conduit with its axis upright and in vertical alignment with the axis of said conduit, the apex of said rotor being uppermost and the maximum diameter of the rotor being greater than the inner diameter of said conduit, means for holding said rotor in a fixed vertical position and for rotating the same about its axis in a direction opposite to that of said conduit, a plurality of bins arranged in a circular pattern in circumferential abutting relation to provide a first bin group, said bins having enclosing sides and open upper and lower ends, said bin group being positioned beneath and in concentric relation with said rotor, the base portion of said rotor having a circular perimeter which overlies the open upper ends of said bins between the radially inner and outer extremities of said open upper end whereby material flowing downwardly over the rotor surface will pass into said bins through the upper ends thereof, said bins and the open upper ends thereof being of equal size, means for controlling the flow of material from said bins through the lower open ends thereof; a supporting frame securing said bins together in said circular pattern, means for swinging said frame about a vertical axis which is aligned with the axis of said rotor, a second cone-shaped rotor disposed immediately beneath the lower open ends of said bins, the lower bin openings being circular and having axes which lie on a circle concentric with said vertical axis, the axis of said second rotor being vertical and also intersecting said last-mentioned circle, the apex of said second rotor uppermost, whereby the contents of said bins may be dispensed individually and sequentially onto said second rotor, means supporting said second rotor in position, and means for weighing said first bin group.

10. Mixing apparatus comprising a first upright tubular conduit having a vertically aligned axis, said conduit having upper and lower ends, means for vertically adjusting and holding said conduit in an adjusted vertical position, means for rotating said conduit in one direction about said axis, a first cone-shaped rotor disposed immediately beneath the lower end of said conduit with its axis upright and in vertical alignment with the axis of said conduit, the apex of said rotor being uppermost and the maximum diameter of the rotor being greater than the inner diameter of said conduit, means for holding said rotor in a fixed vertical position and for rotating the same about its axis in a direction opposite to that of said conduit, a plurality of bins arranged in a circular pattern in circumferential abutting relation to provide a first bin group, said bins having enclosing sides and open upper and lower ends, said bin group being positioned beneath and in concentric relation with said rotor, the base portion of said rotor having a circular perimeter which overlies the open upper ends of said bins between the radially inner and outer extremities of said open upper end whereby material flowing downwardly over the rotor surface will pass into said bins through the upper ends thereof, said bins and the open upper ends thereof being of equal size, means for controlling the flow of material from said bins through the lower open ends thereof; a supporting frame securing said bins together in said circular pattern, means for swinging said frame about a vertical axis which is aligned with the axis of said rotor, a second cone-shaped rotor disposed immediately beneath the lower open ends of said bins, the lower bin openings being circular and having axes which lie on a circle concentric with said vertical axis, the axis of said second rotor being vertical and also intersecting said last-mentioned circle, the apex of said second rotor being uppermost, whereby the contents of said bins may be dispensed individually and sequentially onto said second rotor, and means supporting said second rotor in position.

References Cited

UNITED STATES PATENTS

| 575,550 | 1/1897 | Mathews | 259—180 |
| 2,207,858 | 7/1940 | Gruender | 259—180 |
| 2,460,605 | 2/1949 | Soissa | 259—180 |
| 2,953,359 | 9/1960 | Mau | 259—180 |
| 3,155,377 | 11/1964 | Godman | 259—180 |
| 3,163,402 | 12/1964 | Yamashita | 259—3 |

FOREIGN PATENTS 729,741  5/1932  France.

WALTER A. SCHEEL, *Primary Examiner.*

R. W. JENKINS, *Assistant Examiner.*